(12) United States Patent
Ott et al.

(10) Patent No.: US 7,648,732 B2
(45) Date of Patent: Jan. 19, 2010

(54) COATED METAL ELEMENTS FOR PRODUCING GLASS

(75) Inventors: Franz Ott, Mitterteich (DE); Dirk Gohlke, Mainz (DE); Joerg Witte, Darmstadt (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/947,391

(22) Filed: Nov. 29, 2007

(65) Prior Publication Data
US 2008/0090013 A1     Apr. 17, 2008

Related U.S. Application Data

(62) Division of application No. 10/432,745, filed on Nov. 3, 2003, now Pat. No. 7,338,714.

(51) Int. Cl.
  *B05D 1/12* (2006.01)
(52) U.S. Cl. ........................ 427/193; 427/201
(58) Field of Classification Search ................ 427/193, 427/201, 397.7, 190, 369, 376.1, 376.2
See application file for complete search history.

(56) References Cited

U.S. PATENT DOCUMENTS 4,532,184 A * 7/1985 Schuster ................ 428/433

FOREIGN PATENT DOCUMENTS

EP     0 679 733 A2 * 11/1995

* cited by examiner

*Primary Examiner*—Frederick J Parker
(74) *Attorney, Agent, or Firm*—Michael J. Striker

(57) ABSTRACT

The coated noble metal element used in glass manufacture, such as a noble metal pipe, has an uncoated side that contacts a glass melt and an $H_2$-impervious layer or an $H_2$-impervious and $O_2$-impervious layer, which is provided on a side opposite from the uncoated side. The $H_2$-impervious layer or $H_2$-impervious and $O_2$-impervious layer is heat-resistant and is liquid or solid. In one process for providing the layer on the noble metal element an empty space between the noble metal element and a ceramic insulating jacket is filled with a coating material, and then the coating material is melted so that it wets a surface of the noble metal element. The coating material can include glass cullet, crushed glass or glass powder or is a mixture of crushed glass and ground ceramic material.

15 Claims, 2 Drawing Sheets

US 7,648,732 B2

COATED METAL ELEMENTS FOR PRODUCING GLASS

CROSS-REFERENCE

This is a divisional, filed in accordance with 35 U.S.C. 120, of U.S. patent application Ser. No. 10/432,745, filed Nov. 3, 2003 from which U.S. Pat. No. 7,338,714 issued on Mar. 4, 2008.

BACKGROUND OF THE INVENTION

The invention relates to coated metal elements in glass production, to a process for coating metal elements, particularly metal elements which on one side come in contact with molten glass, and to uses of such coated metal elements in the production and processing of glass.

In the glass-processing industry, containers, means of transport and tools for the handling of glass melts in the production and finishing areas are in many cases made of noble metals of the platinum group (platinum, palladium, rhodium, iridium) or of alloys of these metals with one another or with gold because of their heat-resistance and oxidation resistance. In systems for which this appears reasonable, the surfaces coming in contact with molten glass are coated with a metal of the indicated kind or are covered with a lining made of such a metal. An example of this is a feeder channel provided with a platinum lining which channel constitutes part of a glass-melting system and is usually needed for transporting liquid glass from a melting unit to a processing unit and to glass conditioning.

Molten glass always contains a certain amount of water stemming from the raw materials used for the glass melt, materials which bring the water bound therein into the manufacturing process. The atmosphere surrounding the glass melt and the water it contains, however, must also be taken into consideration. This is true particularly for water-rich furnace atmospheres in oxyfuel-fired melting tanks in which the water contained in the glass can be up to 50% higher than that in tanks that are not oxyfuel-fired.

Depending on the actually prevailing temperature, a certain percentage of the water contained in a glass melt dissociates in contact with a platinum metal forming hydrogen and oxygen. Another reason for water dissociation is based on electrolysis induced by an electric current flowing through the glass. An electric current is introduced into glass, for example, when the glass is heated with electrodes. Whereas hydrogen can diffuse through platinum metals, the oxygen generated in glass cannot. As a result of $H_2$ diffusion and the attendant drop in $H_2$ concentration in the glass, water dissociation reaches an equilibrium. The hydrogen that has diffused through the metal is carried away by the air. The oxygen accumulates at the interface with the platinum until the $O_2$ concentration has exceeded the solubility limit at an $O_2$ partial pressure of about 1 bar and $O_2$-containing bubbles are formed. The bubbles grow as a result of $SO_2$, $N_2$, $CO_2$ and other gases physically dissolved in the glass diffusing into them. They are then carried away by the glass stream and end up in the finished product. This can have a very deleterious effect on the quality of the glass products made.

This affects, in particular, borosilicate glasses, aluminosilicate glasses and glass ceramics. Among the borosilicate glasses, the neutral glasses of importance in pharmacy, industry and chemistry, but also many other borosilicate glasses not belonging to the group of neutral glasses have a particularly pronounced tendency to form $O_2$ bubbles. Among the aluminosilicate glasses, particularly affected are those used for display applications and for lamps exposed to high heat. Moreover, all glasses not containing a sufficiently high concentration of polyvalent ions and which have not been adequately fined have a tendency to form $O_2$ bubbles at platinum surfaces.

It is known from U.S. Pat. No. 5,785,726 that containers made of platinum or a platinum alloy can be protected from the formation of electrochemically generated $O_2$ bubbles by flushing with a hydrogen-containing or water vapor-containing atmosphere.

It is known from WO 98/18731 to prevent bubble formation in the contact zone between the glass melt and platinum or molybdenum by providing $H_2$ on the side facing away from the glass melt. The $H_2$ partial pressure from the outside prevents $H_2$ from diffusing from the melt through the platinum.

The known processes are expensive. They must be supervised and controlled. Disturbances in the control or regulation of the gas supply cause production outages.

In U.S. Pat. No. 3,109,045 is described a crucible made of molybdenum, tungsten, platinum, iron or a resistance alloy and used for melting and fining glass made from mixtures. The crucible is immersed into the liquid glass to prevent admission of air and is thus protected from atmospheric attack and oxidation. This is a method enabling the use of melting crucibles made of refractory metals such as, for example, molybdenum and tungsten which are not oxidation-resistant. Such a system is suitable for the melting of high-temperatured glasses and high-silica glasses with low thermal expansion. This system, however, can also be used for the melting of glasses having a low melting temperature.

SUMMARY OF THE INVENTION

The object of the invention is to provide a metal element made of a noble metal for the production of glass at which element the formation of $O_2$ bubbles can be effectively prevented. In particular, the object of the present invention is to provide equipment and devices made of noble metals for use in the conditioning, homogenization, distribution, heating or shaping of molten glass. Another object of the invention is to provide a process for producing glass whereby the formation of $O_2$ bubbles can be effectively prevented.

The objectives of the present invention are reached by using a coated metal element in the production of glass, said metal element on its side facing away from the glass melt being provided with a layer that is impervious to $H_2$ or to $H_2$ and $O_2$.

Noble metals of the platinum group or the alloys thereof are oxidation-resistant even at high temperatures. Their use for such applications is known from the prior art. Such systems—provided they are used for transporting liquid glass—are usually embedded in ceramic insulating material and with the aid of ceramic mortars and grout. In equipment for shaping molten glass, a core—for example a shaft for a tube-drawing needle or a cylinder for a Danner blowpipe—which consists partly or entirely of ceramic material, is coated with a noble metal.

It is advantageous to provide such equipment made of a platinum metal with a layer impervious to $H_2$ or to $H_2$ and $O_2$. This is intended to prevent not the oxidation of the platinum metal, but the diffusion of hydrogen generated by the process of water dissociation in the glass at the noble metal-glass interface.

The $H_2$-impervious or $H_2$ and $O_2$-impervious layer according to the invention is heat-resistant as well as liquid or solid. For purposes of the present invention, the expression $H_2$-impervious or $H_2$ and $O_2$-impervious means that the imbalance between the $H_2$ and $O_2$ gases dissolved in the glass melt or the ions thereof can, as a result of $H_2$ diffusion through the layer, become only so high as to keep the $O_2$ partial pressure below the solubility limit of $O_2$ so that no $O_2$-containing bubbles are formed at the glass melt/metal interface.

A preferred embodiment of the invention is a coated metal element wherein the $H_2$-impervious or $H_2$ and $O_2$-impervious layer contains at least one glass or glass mixture or a partly or entirely crystallized glass or a ceramic material.

A preferred embodiment of the invention is a coated metal element wherein the $H_2$-impervious or $H_2$ and $O_2$-impervious layer contains at least one glass having the following composition.

| | |
|---|---|
| $SiO_2$ | 40 to 99 wt. % |
| $Al_2O_3$ | 1 to 30 wt. % |
| $B_2O_3$ | 0 to 30 wt. % |
| BaO | 0 to 15 wt. % |
| CaO | 0 to 20 wt. % |
| MgO | 0 to 8 wt. % |
| $ZrO_2$ | 0 to 5 wt. % |
| $\Sigma R_2O$ | 0 to 25 wt. % |
| $P_2O_5$ | 0 to 10 wt. % |
| $Cr_2O_3$ | 0 to 3 wt. % |
| $TiO_2$ | 0 to 10 wt. % |
| $Fe_2O_3$ | 0 to 10 wt. % |
| ZnO | 0 to 5 wt. % |
| MnO | 0 to 10 wt. % |
| SrO | 0 to 10 wt. % |
| PbO | 0 to 70 wt.: % |
| Fluorine | 0 to 1 wt. % |

Moreover, the glass can contain other components such as, for example, $Sb_2O_3$, $As_2O_3$, $Cl^-$, $SO_3$, oxides of the rare earth elements, coloring oxides of the subgroup elements and other components present in glass.

$\Sigma R_{2O}$ is the sum of all alkali metal oxides, particularly the sum of $Li_2O$, $Na_2O$, $K_2O$ and $Cs_2O$.

Another preferred embodiment of the invention is a coated metal element wherein the $H_2$-impervious or $H_2$ and $O_2$-impervious layer contains at least one glass having the following composition:

| | |
|---|---|
| $SiO_2$ | 55 to 70 wt. % |
| $Al_2O_2$ | 10 to 30 wt. % |
| $B_2O_3$ | 0 to 15 wt. % |
| BaO | 5 to 15 wt. % |
| CaO | 3 to 15 wt. % |
| MgO | 0 to 8 wt. % |
| SrO | 0 to 10 wt % |
| $ZrO_2$ | 0 to 2 wt. % |
| $\Sigma R_2O$ | 0 to 5 wt. % |
| $P_2O_5$ | 0 to 10 wt. % |
| $Cr_2O_3$ | 0 to 1 wt. % |
| $TiO_2$ | 0 to 1 wt. % |
| $Fe_2O_3$ | 0 to 1 wt. % |
| ZnO | 0 to 1 wt. % |

Another preferred embodiment of the invention is a coated metal element wherein the $H_2$-impervious or $H_2$ and $O_2$-impervious layer contains at least one glass having the following composition.

| | |
|---|---|
| $SiO_2$ | 70 to 85 wt. % |
| $Al_2O_3$ | 1 to 8 wt. % |
| $B_2O_3$ | 5 to 25 wt. % |
| BaO | 0 to 5 wt. % |
| CaO | 0 to 3 wt. % |
| MgO | 0 to 3 wt. % |
| $ZrO2$ | 0 to 2 wt. % |
| $\Sigma R_2O$ | 3 to 15 wt. % |
| $P_2O_5$ | 0 to 2 wt. % |
| $Cr_2O_3$ | 0 to 2 wt. % |
| $TiO_2$ | 0 to 6 wt. % |
| MnO | 0 to 6 wt % |
| $Fe_2O_3$ | 0 to 5 wt. % |
| ZnO | 0 to 2 wt. % |
| Fluorine | 0 to 0.5 wt. % |

Another preferred embodiment of the invention is a coated metal element wherein the $H_2$-impervious or $H_2$ and $O_2$-impervious layer contains at least one glass having the following composition.

| | |
|---|---|
| $SiO_2$ | 65 to 75 wt. % |
| $Al_2O_3$ | 2 to 6 wt. % |
| $B_2O_3$ | 0 to 3 wt. % |
| BaO | 0 to 5 wt. % |
| CaO | 2 to 7 wt. % |
| MgO | 0 to 5 wt. % |
| $ZrO_2$ | 0 to 1 wt. % |
| $\Sigma R_2O$ | 10 to 20 wt. % |
| $P_2O_5$ | 0 to 5 wt. % |
| $Cr_2O_3$ | 0 to 1 wt. % |
| $TiO_2$ | 0 to 1 wt. % |
| $Fe_2O_3$ | 0 to 5 wt. % |
| Fluorine | 0 to 1 wt % |
| ZnO | 0 to 1 wt. % |

Another preferred embodiment of the invention is a coated metal element wherein the $H_2$-impervious or $H_2$ and $O_2$-impervious layer contains at least one glass having the following composition.

| | |
|---|---|
| $SiO_2$ | 55 to 75 wt. % |
| $Al_2O_3$ | 15 to 25 wt. % |
| $B_2O_3$ | 0 to 3 wt. % |
| BaO | 0 to 5 wt. % |
| ZnO | 0 to 3 wt. % |
| MgO | 0 to 2 wt. % |
| $ZrO_2$ | 0 to 3 wt. % |
| $\Sigma R_2O$ | 1 to 7 wt. % |
| $P_2O_5$ | 0 to 5 wt. % |
| $Cr_2O_3$ | 0 to 1 wt. % |
| $TiO_2$ | 0 to 5 wt. % |
| $Fe_2O_3$ | 0 to 5 wt. % |

Moreover, $As_2O_3$, $Sb_2O_3$, and coloring components in an amount from 0 to 3 wt. % each can be contained in the glass.

A particularly preferred embodiment of the invention is a coated metal element wherein the $H_2$-impervious or $H_2$ and $O_2$-impervious layer consists of the same glass as the glass which is transported, conditioned, shaped or processed with the metal element coated in this manner.

A preferred embodiment of the invention is a coated metal element wherein the $H_2$-impervious or $H_2$ and $O_2$-impervious layer has a thickness of at least 0.02 mm and preferably 1 to 10 mm and even greater.

A preferred embodiment of the invention is a coated metal element wherein the material used for the $H_2$-impervious or $H_2$ and $O_2$-impervious layer has a viscosity of 10 to $10^8$ dPa·s and preferably $10^2$ to $10^6$ dPa·s.

A preferred embodiment of the invention is a coated metal element wherein the material used for the $H_2$-impervious or $H_2$ and $O_2$-impervious layer is made from crushed glass or cullet that is mixed with ground ceramic material. The ceramic particles can be coarse or finely ground, the particle size and particle size distribution being selected in accordance with the intended use.

A preferred embodiment of the invention is a coated metal element wherein the $H_2$-impervious or $H_2$ and $O_2$-impervious layer consists of a ceramic material mixed with crushed glass, the crushed glass preferably having a particle size of <10 mm and particularly of >1 mm.

A preferred embodiment of the invention is a coated metal element containing at least one metal from the group consisting of rhodium, iridium, palladium and platinum and an alloy or compound with at least one of these metals or with gold or a fine grain-stabilized noble metal.

A preferred embodiment of the invention is a coated metal element that is thermally insulated with ceramic masonry and has a gap between the metal element and the ceramic material, said element being provided with one or more support elements. In this manner, the load on the coated metal element is mechanically reduced so that said element cannot undergo deformation. At the same time, this ensures that the gap will be permanently retained. Sufficiently large openings are provided between the support elements to allow unhindered flow of the coating medium, for example glass, and to allow the air to escape.

The support elements can be made of metal or ceramic material. The ceramic material is the same as that usually employed in the glass industry as insulating material or material for the construction of tanks and which has a sufficiently high heat resistance. Particularly suitable for this purpose are commercial grades of ceramic material intended for contact with molten glass. The metallic support elements consist of a heat-resistant metal and preferably of the same metal as the structural component to be coated.

This sealing of the "backside" of the metal element facing away from the glass melt, which metal element on one side is in contact with the glass melt, with a layer that reduces the $H_2$ permeability or $H_2$ and $O_2$ permeability and that consists of a meltable or partly or entirely crystallized material or of a ceramic material, reduces the diffusion of hydrogen through the metal element from the side in contact with the glass melt to the backside of the metal element, namely the side that faces away from the glass melt. On the other hand, the sealing thus brought about prevents the atmospheric oxygen present in the atmosphere surrounding the backside of the metal element from coming in contact with the metal element, reacting with the hydrogen that is diffusing out and forming water. The seal indirectly enables the elementary reactions bringing about water dissociation and which take place in the glass melt/metal element contact zone to reach a state of equilibrium. This is due to the fact that after a certain enrichment of the metal element with hydrogen, hydrogen is no longer removed from the glass melt/metal element reaction zone, and water dissociation comes to an end.

The composition of the glass used to coat the noble metal is selected on the basis of different criteria. Basically, it is particularly advantageous if the composition of the contacting glass that is to be processed and of the glass used to coat and seal against hydrogen diffusion are identical or at least similar. Coating glasses with a basicity that differs markedly from that of the glass to be processed are to be avoided. Under such conditions, as a result of electrochemical effects, new bubbles can be formed on the platinum or the platinum alloy and end up in the product.

Particularly suitable are process variants wherein the applied protective layer is elastic. In the most advantageous case, the process of the invention should hermetically seal the metal element. Ideally, this can be accomplished by means of an elastic protective layer which within certain limits follows the thermal expansions and compressions of the metal element bearing said layer.

Metal elements used in the glass-processing industry, in particular, must be assumed to undergo frequent temperature changes and attendant thermal expansions. The selection of the material to be used for the protective layer is therefore particularly important if the objective of the invention is to be reached in optimum fashion.

Advantageous are processes whereby the metal element provided with a protective layer is covered with a ceramic material or the metal element coated with a protective layer is embedded in ceramic masonry or thermal insulation.

In accordance with a variant of the invention, the glass, glass solder, composite glass or glass ceramics used for the protective layer have a liquidus temperature that is higher than the operating temperature of the metal element to be coated.

The crystallizing layers then at first consist of liquid glass the liquidus temperature of which, as stated previously, is above the operating temperature of the metal element so that after days or weeks a partly or entirely crystalline glass body is formed which confers additional stability to the metal element. If during the use of a metal element coated or enveloped in this manner cracks caused by mechanical stress or other factors appear in the covering, these cracks will be repaired within a short time because of the still partly present glass phase so that the desired long-term gas impermeability of the protective layer will remain preserved to the highest possible degree. The fluid glass phase in this case covers the open spots of the damaged protective layer thus repairing the cracks.

The material, however, can also have a liquidus temperature that is below the operating temperature so that in this case the metal element must be able to retain its shape. This variant has the advantage that the metal elements are always sealed by liquid glass. It is also necessary to ensure, however, that the liquid protective layer does not attack the thermal insulation made of ceramic material that may be in direct contact with it so strongly that the insulating action and the protective function of the ceramic material are negatively affected. This can be avoided by appropriate selection of the coating and insulating materials.

The operating temperature of the metal element to be coated and the temperature-dependent properties of the glass constituting the protective layer should preferably be adapted to each other. For structural components that are not involved in processing, the protective layer does not necessarily have to bring about an ideally gas-tight, hermetic sealing of the metal element. What is critical is only that when the structural component is used as directed or is possibly subjected to an additional heat treatment, the applied protective layer perform the task for which it is intended according to the invention and form an essentially gas-tight protective layer.

Recommended is the process in which the applied protective layer has a thickness of at least 0.02 mm and preferably from 1 to 10 mm. Preferred are process variants in which the material used has a viscosity from 10 to $10^8$ dPa·s and preferably from $10^2$ to $10^6$ dPa·s. The reason behind this special process characteristic is that the viscosity of the glass in which the formation of $O_2$ bubbles must be prevented is as a rule in the range from 10 to 10 dPa·s and particularly from $10^2$ to $10^6$ dPa·s, and that the material chosen for sealing preferably should have the same viscosity. Another reason for this is that the coating material must not be too fluid nor too viscous. On the one hand, the metal must be completely wetted by the glass constituting the coating, so that it is necessary for the glass to be so fluid that, to be able to perform the sealing, it flows on the metal element forming a closed protective layer. On the other hand, however, the glass must not be too fluid so that it will pass through any joints or gaps of a possibly present insulation material or that because of its low viscosity it will, for example, dissolve or damage any ceramic insulation that may be present.

According to the invention, very good results in terms of reducing bubble formation are obtained when the glass used for the $H_2$-impervious or $H_2$ and $O_2$-impervious layer is the same as the glass melt which by means of this metal element is transported, conditioned or processed and shaped into a finished product.

Recommended is a process variant whereby the metal element to be coated is provided on the side to be coated with an insulating jacket in a manner such that an empty space or gap is formed between the surface to be coated and the insulating jacket. The empty space thus formed is filled with the coating material. By applying a sufficiently high temperature the material is made to melt so that the resulting viscous material completely wets the surface to be coated forming a protective layer.

An advantageous process is the one in which an empty space is formed between the insulation and the surface to be coated, the gap being between 1 and 10 mm wide. The width of this gap can also be greater, depending on the application. Usually, the empty space is filled with cullet, crushed glass or glass powder which at a sufficiently high temperature melts and wets the metal element from the outside with liquid glass which can later crystallize. During the melting, more cullet or ground glass is added until the empty space is full and the metal element is completely wetted with glass.

A second variant of the process of the invention is characterized in that the protective layer is applied by flame spraying or plasma spraying of ceramic materials, particularly powders, with or without glass particles. By incorporating glass particles, the open pores of the ceramic layer are sealed. Cracks caused by temperature fluctuations or mechanical stress can again be repaired.

In terms of its thermal expansion, the material used for the protective layer in this process is adapted as much as possible to the material constituting the metal element to be coated.

Notable is also a process variant whereby the protective layer is applied by spreading a pasty material, which after it is applied to the surface to be coated is subjected to heat high enough to cause the formation of a glassy, essentially gas-tight glaze. The protective layer thus formed can remain glassy and viscous or partly or completely crystalline, depending on the composition of the pasty material selected.

The pasty material can also be mixed with crushed glass or glass powder so that after heat treatment a glass layer is formed.

Particularly recommended is a process variant whereby crushed glass preferably having a particle size of <1 mm is blended with a ceramic grout composition, and the resulting mixture is applied to the surface of the metal element to be coated. In this manner, the grout composition forms a solid support structure for the coated metal, and the ground glass takes over the sealing function in that it fills the empty space and closes the open pores of the ceramic grout composition. Preferably, the crushed glass used for the protective layer is blended with the ceramic grout composition in a ratio from 20:1 to 1:20 and particularly from 10:1 to 1:10.

Preferably used are the types of glass that do not attack and/or melt the ceramic composition or grout composition. This ensures that the ceramic composition will retain sufficiently high strength and supporting ability. Hence, preferred are glasses containing only a minor amount of flux or possibly devoid of flux altogether. In this respect, fluxes include, among others components, fluorine or the oxides of boron and of alkali metals.

Particularly preferred as contact materials or as additives to the glasses used for coating the metal elements are the types of ceramics and fire-resistant materials used as linings for glass-melting tanks. These materials resist in optimum manner and to the highest degree possible not only high temperatures but also attack by molten glasses. Particularly well suited to this end are ceramic or melt-cast fire-resistant materials based on $SiO_2$, $ZrO_2$ and $Al_2O_3$ alone or in combination with one another. Melt-cast fire-resistant stones of this kind are known and marketed, for example, as AZS or high-zirconium stones or as zirconium silicate. They can also contain MgO, CaO, $P_2O_5$, $Fe_2O_3$, $TiO_2$, $Cr_2O_3$ and other components. In particular, melt-cast materials are very dense and free of open pores.

It is possible to add to the crushed glass used to fill the gap between the metal element and the insulation and to form the $H_2$-impervious or $H_2$ and $O_2$-impervious coating more or less coarsely ground particles and grit of these materials without running the risk that they will be dissolved by the glass. The solid ceramic or melt-cast constituents of this coating confer to the coated metal element firmness and support particularly when the particle size distribution of these solid constituents is selected so that the diameter of the largest particles of the grit is exactly as large as the gap between the metal element and the insulation.

The following table provides a summary of a few examples of materials used according to the invention, the data being expressed in weight percent (wt. %).

| | Glass 1 | Glass 2 | Glass 3 | Glass 4 | Glass 5 | Grout 1 | Grout 2 | Ceramic material 1 | Ceramic material 2 | Ceramic material 3 |
|---|---|---|---|---|---|---|---|---|---|---|
| $SiO_2$ | 60 | 61 | 81 | 75 | 69 | 0.5 | 100 | 64 | 15-100 | 1-100 |
| $Al_2O_3$ | 14 | 16.5 | 2 | 5.3 | 4 | 95 | — | 31 | 0-75 | 0-95 |
| $B_2O_3$ | 4.5 | 0.5 | 13 | 10.5 | 1 | — | — | — | — | — |
| BaO | 9 | 8 | — | 0.6 | 2 | — | — | — | — | — |
| CaO | 10 | 13 | — | 1.4 | 5 | 4 | — | — | <1 | — |
| MgO | 2.5 | <0.5 | — | — | 3 | — | — | 1 | 0-5 | — |
| $ZrO_2$ | — | 1 | — | — | — | — | — | — | — | 0-99 |
| $\Sigma R_2O$ | <0.1 | <0.1 | 4 | 7 | 16 | 0.5 | — | 2 | 0-2 | — |
| $P_2O_5$ | — | — | — | — | — | — | — | — | — | 0-5 |
| $Cr_2O_3$ | — | — | — | — | — | — | — | — | — | 0-0.95 |

-continued

|  | Glass 1 | Glass 2 | Glass 3 | Glass 4 | Glass 5 | Grout 1 | Grout 2 | Ceramic material 1 | Ceramic material 2 | Ceramic material 3 |
|---|---|---|---|---|---|---|---|---|---|---|
| $TiO_2$ | — | — | — | — | — | — | — | 1 | 0-2 | 0-3 |
| $Fe_2O_3$ | — | — | — | — | — | — | — | 1 | 0-2 | 0-3 |
| Fluorine | — | — | — | 0.2 | — | — | — | — | — | — |

The viscosity of the glasses chosen as additives to the ceramic material is preferably adapted to the operating temperature of the structural component to be coated so that the added glass constituents will melt and wet said component thus ensuring reliable sealing.

Advantageous are processes whereby the ceramic composition used for the protective layer is supplemented by addition of cullet, crushed glass or glass powder, and this mixture is applied to the surface to be coated of the metal element to be coated.

According to another process variant, cutlet or crushed glass is wound around the metal element to be coated with the aid of a pad of ceramic insulating fibers and thus brought in contact with the surface to be coated. By applying a sufficiently high temperature, the cutlet or crushed glass thus positioned between the insulating pad and the surface to be coated is sintered and on melting wets the metal thus forming a closed protective layer.

According to a further embodiment of the process of coating the noble metal element a ceramic material is ground and mixed with crushed glass or glass powder to form a glass-ceramic mixture, which is compressed and sintered to form a sintered molding, which covers the noble metal element on a side facing away from the glass melt. Then the sintered molding is heated to a temperature that is sufficiently high to melt the crushed glass or glass powder in the sintered molding so as to wet the noble metal element and form the protective layer on it.

Another process variant is characterized in that at first a porous oxide layer is applied by a thermal spraying method and then to this layer is applied a paste consisting of up to 80 wt. % of a glass powder or ceramic glass powder. By heating the structural component thus coated to a temperature above the softening temperature of the glass or of the ceramic glass powder, the open pores in the region close to the surface of the sprayed-on layer are infiltrated by glass and thus sealed.

Another process variant is characterized in that an oxide layer is applied by plasma spraying or flame spraying, said layer preferably having a thickness of 20 μm to 1000 μm and being based on aluminum oxide, zirconium oxide, titanium oxide or a spinel. Advantageous are process variants whereby an oxide layer with a porosity of 5 to 20% is applied and processes whereby the surface to be coated is first sand-blasted or shot peened to improve the adhesion of the oxide layer.

According to the invention, the $H_2$-impervious or $H_2$ and $O_2$-impervious layer for coating metal elements coming in contact with molten glass is intended for use on platinum electrodes in distributors, channels or melting tanks; pipes for conveying and conditioning glass melts, such as feeding channels and Danner channels, Vello draw heads and A-draw heads, shaping tools for producing pipes and rods, such as Vello needles, downdraw needles, discharge rings and platinum-lined Danner blowpipes, jacketed platinum tubes for direct heating of bottom outlets, transport equipment or charging organs, agitators, pipe-drawing heads, feeder heads, plungers in gob feeders, drawing tanks and drawing lips for flat glass production and fining chambers that are installed downstream from melting equipment.

According to the invention, the coated metal elements are used in glass melting, glass transportation, glass conditioning, glass homogenization and glass processing or shaping.

BRIEF DESCRIPTION OF THE DRAWING

In the following, the device of the invention is illustrated in greater detail by way of a drawing and examples. The drawing consists of FIG. 1 and FIG. 2, in which.

DETAILED DESCRIPTION OF THE INVENTION

Figure 1:
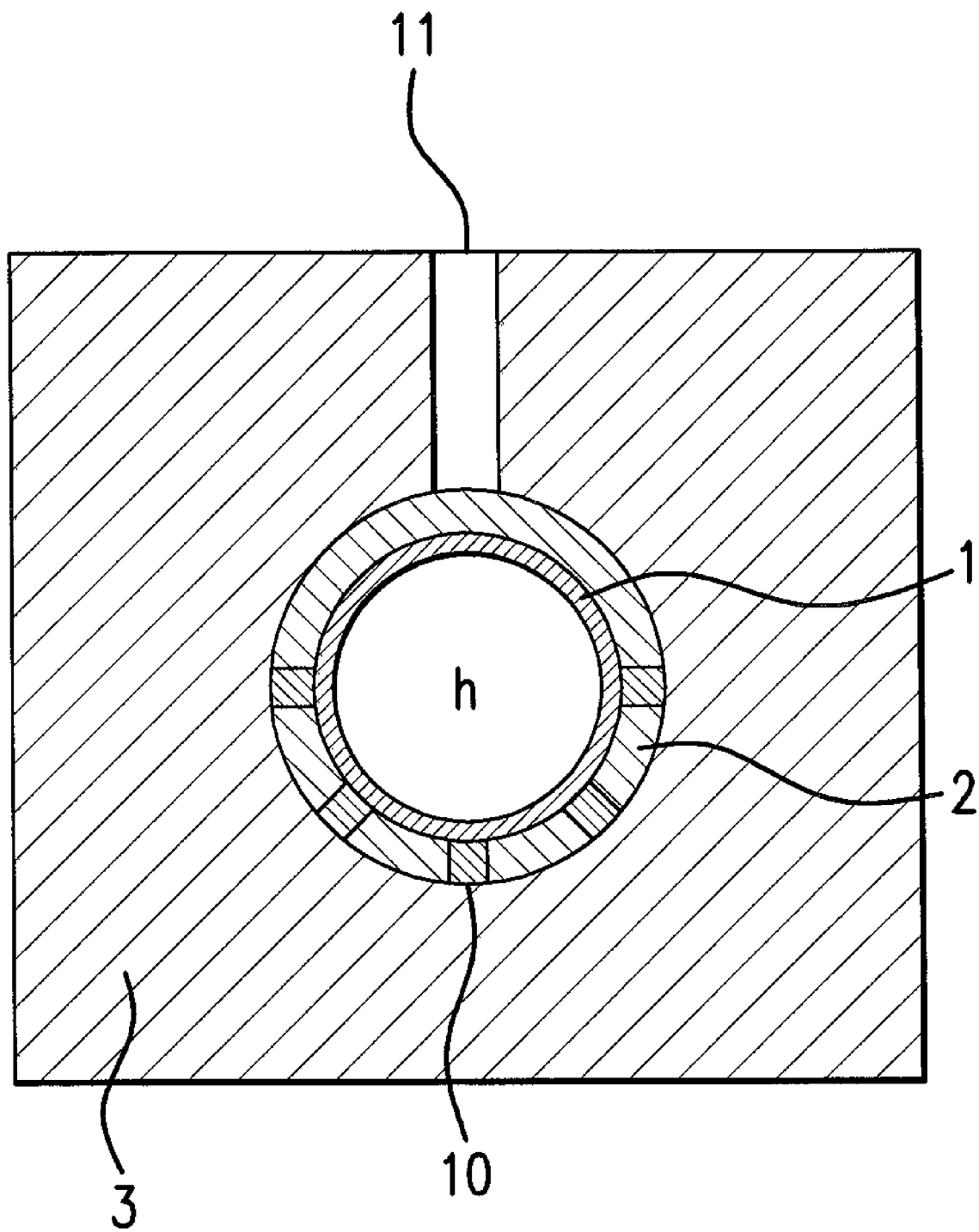
FIG. 1 shows a cross-section of a glass-conveying platinum pipe provided with a protective layer, in particular a cross-section through a Danner channel with support elements.

FIG. 1 shows a glass-conveying platinum pipe (1) in cross-section. The glass-conveying platinum pipe (1) has preferably been provided, by means of one of the afore-described process variants, with a protective layer (2), which fills an empty space around the platinum pipe (1). The entire structural component consisting of the glass-conveying platinum pipe (1) with the protective layer (2) applied thereon being embedded in insulation (3) consisting of ceramic material The insulation (3) as a rule consists of masonry, which in addition to its supporting function also provides heat insulation.

What is shown, in particular, is a Danner channel (1) with support elements (10). The Danner channel (1) has several support elements (10). The support elements (10) are disposed between the Danner channel (1) and the insulation (3). Between the support elements (10) are provided sufficiently large openings so that the glass flow is unhindered and air can escape. The support elements (10) can consist of metal or ceramic material. Finally, the figure shows a filling port (11) for the glass used for coating.

Figure 2:
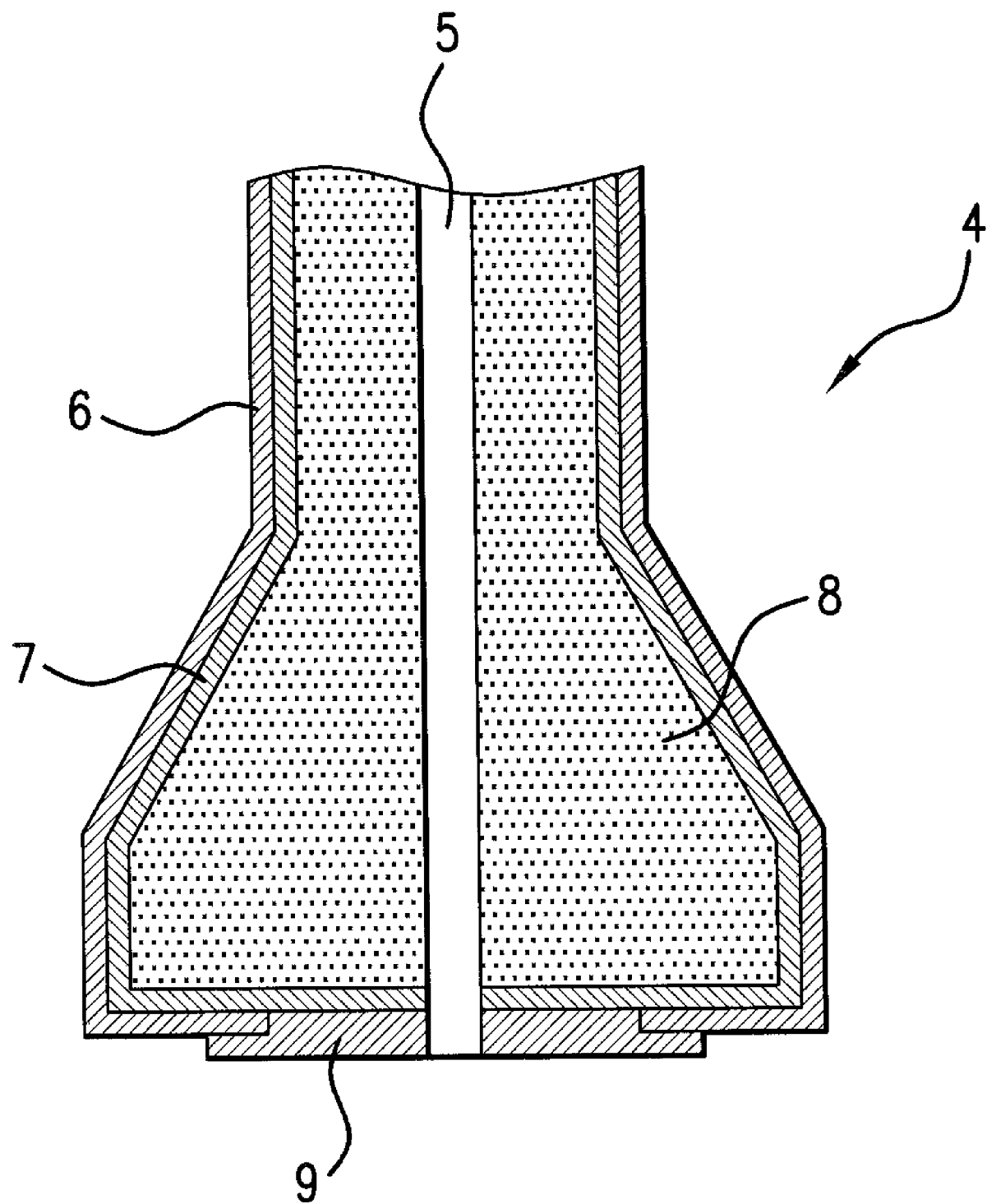
FIG. 2 shows a longitudinal cross-section of a Vello needle.

FIG. 2 shows a Vello needle (4) in longitudinal cross-section. To the shaft and the core (8), in the middle of which is disposed a channel for blowing in air (5), has been applied, by use of one of the afore-described process variants, an essentially gas-tight protective layer (7) on which, in turn, rests the platinum lining (6) known from conventional Vello needles (4). The Vello needle (4) is an example of a structural component exposed externally to a glass melt. Hence, unlike the glass-conveying platinum pipe (1 shown in FIG. 1, this structural component is not provided with a protective layer (2) externally, but on the inside which in the case of the Vello needle (4) represents the side facing away from the surface exposed to the glass melt and thus is the side to be coated. At its end, the Vello needle (4) is provided with a seal (9) to prevent the more or less viscous protective layer (7) from escaping.

As already mentioned, in the production of the Vello needle (4), the protective layer is first applied to the shaft and the core (8). In any case, in doing so, it is necessary to ensure that, following a heat treatment or during use of the Vello needle (4), the platinum lining (6) resting on the protective layer (7) is wetted and enveloped and thus essentially sealed in gas-tight manner by the protective layer (7) in that the layer melts or has the fluidity required for wetting the platinum lining (6).

EXAMPLES

Set-up

In a Danner channel made of a platinum alloy and having a diameter of 110 mm, glass No. 4 (see table) was conditioned at a temperature of 1250° C. for the tube-drawing process. The platinum channel was heat-insulated with an $SiO_2$-ceramic material and embedded so that a gap of about 1 cm existed around the platinum pipe, the lower half of said platinum pipe being supported by many small ceramic spacers.

Comparative Example 1

Platinum Pipe with Admission of Air

The outside of the glass-conveying platinum pipe was first exposed to air. Sorting based on quality criteria resulted in approximately 40% production waste caused by the presence of bubbles. To be able to determine the nature of the gas contained in the bubbles, glass samples were taken at the outlet from the Danner channel, the bubbles contained therein were cut out in the laboratory and then broken open in a gas chromatograph. The composition of the gas contained in the bubbles was determined. The contents of most bubbles consisted of pure $O_2$. This is an unequivocal indication that these bubbles were formed electrochemically at the platinum/glass melt interface and could have been only a few minutes old. Otherwise, other gases, for example $SO_2$, $N_2$ or $CO_2$ would also have been detected.

Comparative Example 2

Platinum Pipe with Hydrogen

By introducing a weak forming gas consisting of $N_2$ and very little $H_2$, as described in U.S. Pat. No. 5,785,726, the formation of $O_2$-containing bubbles at the interface with the platinum was effectively suppressed. Glass samples taken at the outlet of the Danner channel contained no bubbles with 100% oxygen. Found were only bubbles the contents of which indicated that they had been formed in the melting tank and were not completely removed from the glass during fining. In essence, these bubbles contained $SO_2$, $N_2$ and $CO_2$. The production waste caused by bubbles was reduced to a normal proportion of 3-5%.

This process has the drawback that it cannot be run without supervision and that it is uneconomical. The $H_2$ partial pressure in the flushing gas must be permanently determined by measuring the redox potential at the platinum and must be controlled via the $H_2$ partial pressure in the flushing gas. Otherwise, the danger exists that the $O_2$-reducing action in the glass will not be sufficient to suppress the electrochemically formed $O_2$ bubbles or that, as a result of over-reduction, the platinum will be damaged and embrittled, which would require rebuilding the platinum Danner channel.

Comparative Example 3

Platinum Pipe with Water Vapor

In a second test, $H_2$ vapor-containing air was fed through the gap (FIG. 1) between the platinum pipe and the ceramic insulation, the air stream having been passed through a water container heated to 70° C., which enriched the air stream with water vapor. By this process, the production waste due to bubbles was reduced to about 5% and the electrochemical generation of $O_2$ bubbles was effectively suppressed. This process, however, also has the drawback that it is not supervision-free and the $H_2O$ partial pressure in the flushing gas must be controlled.

Example

Platinum Pipe with a Glass Coating

In a third test in the same Danner channel, the empty space around the platinum pipe was first flushed with air devoid of $H_2$ or $H_2O$ vapor. $O_2$-containing bubbles formed immediately at the platinum/glass melt interface, which lead to a rapid increase in waste caused by bubbles, as in comparative example 1. Thereafter, the platinum Danner channel was sealed according to the present invention with a 1 cm-thick glass coating. The coating process was carried out by introducing cullet of glass No. 4 through several openings in the ceramic insulation, which were provided expressly for this purpose. At the operating temperature of 1250° C., the cullet melted immediately and the resulting glass melt spread out in the empty space between the platinum pipe and the ceramic insulation while the air escaped through the feeding port. Cullet was fed until the empty space around the platinum pipe was full and the outside of the platinum pipe was completely wetted with glass and a 1 cm-thick glass layer had formed. The production waste was immediately reduced to 3-5% and was caused only by bubbles entrained from the tank. Once again, the glass product formed had no $O_2$-containing bubbles, as established by gas-chromatographic analysis of the gas contents of a representative number of bubbles.

The platinum Danner channel thus coated was used continuously over a period of two weeks. This unequivocally demonstrates the reliable action of the coating.

This process no longer shows the drawbacks of the two afore-described methods involving flushing with a weak forming gas or with $H_2O$ vapor-enriched air. The advantage of the device according to the invention is that it is entirely supervision-free, requires no control, is safe for the platinum, causes no process costs and reliably suppresses the formation of $O_2$-containing bubbles. By the 1 cm-thick glass layer surrounding the platinum piper the diffusion through the platinum of $H_2$ from the glass transported in the platinum pipe was entirely prevented, and the electrochemical dissociation of water in the glass was effectively suppressed. The device according to the invention is used very advantageously in the process of the invention.

The invention claimed is:

1. A process of coating a noble metal element used in glass processing or production, said noble metal element having a side that comes in contact with a glass melt during said glass processing or production and another side that faces away from the glass melt during said glass processing or production, said process comprising the steps of:
    a) providing the noble metal element with an insulating jacket so that an empty space is formed between said insulating jacket and a surface of the noble metal element on said another side that faces away from the glass melt during said glass processing or production;
    b) filling said empty space with a coating material; and
    c) heating said coating material to a temperature sufficient to melt said coating material so that a viscous material results from the heating and completely wets said surface of the noble metal element to form a protective layer that coats said surface on said another side of the noble metal element that faces away from the glass melt during said glass processing or production;

wherein said protective layer is an $H_2$-impervious layer or an $H_2$-impervious and $O_2$-impervious layer with a thickness greater than or equal to 1 mm and contains at least one glass or glass mixture or a partly crystallized glass or a ceramic material.

2. The process as defined in claim 1, wherein said coating material comprises a mixture of ground ceramic material and crushed glass, said crushed glass comprising glass particles with a particle size less than 1 mm.

3. The process as defined in claim 1, wherein said coating material has a viscosity of 10 to $10^8$ dPa·s when said viscous material wets said surface of said noble metal element.

4. The process as defined in claim 3, wherein said viscosity is from $10^2$ dPa·s to $10^6$ dPa·s.

5. The process as defined in claim 1, wherein said empty space is from 1 to 10 mm wide and said coating material comprises cullet, crushed glass or glass powder.

6. The process as defined in claim 1, wherein said noble metal element comprises at least one metal, an alloy with said at least one metal or with gold, a compound of said at least one metal or of said gold, or a fine grain-stabilized noble metal; and wherein said at least one metal is selected from the group consisting of platinum, rhodium, iridium and palladium; and wherein said at least one fine grain-stabilized noble metal is selected from the group consisting of platinum, rhodium, iridium and palladium.

7. The process as defined in claim 1, further comprising providing metal or ceramic support elements between the insulating jacket and the noble metal element, but with sufficiently large openings between the support elements to allow unhindered flow of the coating material into the empty space.

8. The process as defined in claim 1, wherein said coating material comprises at least one glass material and said at least one glass material has a composition, in percent by weight, comprising:

| | |
|---|---|
| $SiO_2$ | 40 to 99 |
| $Al_2O_3$ | 1 to 30 |
| $B_2O_3$ | 0 to 30 |
| BaO | 0 to 15 |
| CaO | 0 to 20 |
| MgO | 0 to 8 |
| $ZrO_2$ | 0 to 5 |
| $\Sigma R_2O$ | 0 to 25 |
| $P_2O_5$ | 0 to 10 |
| $Cr_2O_3$ | 0 to 3 |
| $TiO_2$ | 0 to 10 |
| $Fe_2O_3$ | 0 to 10 |
| ZnO | 0 to 5 |
| MnO | 0 to 10 |
| SrO | 0 to 10 |
| PbO | 0 to 70 |
| Fluorine | 0 to 1, | wherein $\Sigma R_2O$ denotes a sum total amount of $Li_2O$, $Na_2O$, $K_2O$ and $Cs_2O$.

9. The process as defined in claim 1, wherein said coating material comprises at least one glass material and said at least one glass material has a composition, in percent by weight, comprising:

| | |
|---|---|
| $SiO_2$ | 55 to 70 |
| $Al_2O_3$ | 10 to 30 |
| $B_2O_3$ | 0 to 15 |
| BaO | 5 to 15 |
| CaO | 3 to 15 |
| MgO | 0 to 8 |
| SrO | 0 to 10 |
| $ZrO_2$ | 0 to 2 |
| $\Sigma R_2O$ | 0 to 5 |
| $P_2O_5$ | 0 to 10 |
| $Cr_2O_3$ | 0 to 1 |
| $TiO_2$ | 0 to 1 |
| $Fe_2O_3$ | 0 to 1 |
| ZnO | 0 to 1, | wherein $\Sigma R_2O$ denotes a sum total amount of $Li_2O$, $Na_2O$, $K_2O$ $Cs_2O$.

10. The process as defined in claim 1, wherein said coating material comprises at least one glass material and said at least one glass material has a composition, in percent by weight, comprising:

| | |
|---|---|
| $SiO_2$ | 70 to 85 |
| $Al_2O_3$ | 1 to 8 |
| $B_2O_3$ | 5 to 25 |
| BaO | 0 to 5 |
| CaO | 0 to 3 |
| MgO | 0 to 3 |
| $ZrO_2$ | 0 to 2 |
| $\Sigma R_2O$ | 3 to 15 |
| $P_2O_5$ | 0 to 2 |
| $Cr_2O_3$ | 0 to 2 |
| $TiO_2$ | 0 to 6 |
| MnO | 0 to 6 |
| $Fe_2O_3$ | 0 to 5 |
| ZnO | 0 to 2 |
| Fluorine | 0 to 0.5, | wherein $\Sigma R_2O$ denotes a sum total amount of $Li_2O$, $Na_2O$, $K_2O$ and $Cs_2O$.

11. The process as defined in claim 1, wherein said coating material comprises at least one glass material and said at least one glass material has a composition, in percent by weight, comprising:

| | |
|---|---|
| $SiO_2$ | 65 to 75 |
| $Al_2O_3$ | 2 to 6 |
| $B_2O_3$ | 0 to 3 |
| BaO | 0 to 5 |
| CaO | 2 to 7 |
| MgO | 0 to 5 |
| $ZrO_2$ | 0 to 1 |
| $\Sigma R_2O$ | 10 to 20 |
| $P_2O_5$ | 0 to 5 |
| $Cr_2O_3$ | 0 to 1 |
| $TiO_2$ | 0 to 1 |
| $Fe_2O_3$ | 0 to 5 |
| Fluorine | 0 to 1 |
| ZnO | 0 to 1, | wherein $\Sigma R_2O$ denotes a sum total amount of $Li_2O$, $Na_2O$, $K_2O$ and $Cs_2O$.

12. The process as defined in claim 1, wherein said coating material comprises at least one glass material and said at least one glass material has a composition, in percent by weight, comprising:

| | |
|---|---|
| $SiO_2$ | 55 to 75 |
| $Al_2O_3$ | 15 to 25 |
| $B_2O_3$ | 0 to 3 |
| BaO | 0 to 5 |
| ZnO | 0 to 3 |
| MgO | 0 to 2 |
| $ZrO_2$ | 0 to 3 |
| $\Sigma R_2O$ | 1 to 7 |
| $P_2O_5$ | 0 to 5 |
| $Cr_2O_3$ | 0 to 1 |
| $TiO_2$ | 0 to 5 |
| $Fe_2O_3$ | 0 to 5, | wherein $\Sigma R_2O$ denotes a sum total amount of $Li_2O$, $Na_2O$, $K_2O$ and $Cs_2O$.

13. The process as defined in claim 1, wherein said coating material is crushed glass.

14. The process as defined in claim 1, wherein said coating material comprises crushed glass and coarsely ground ceramic particles or said coating material comprises crushed glass and refractory materials.

15. A process of coating a noble metal element used in glass processing or production, said noble metal element having a side that comes in contact with a glass melt during said glass processing or production and another side that faces away from the glass melt during said glass processing or production, said process comprising the steps of:
 a) grinding a ceramic material or a melt-cast refractory material to form a ground material and mixing the ground material with crushed glass or glass powder to form a glass-ceramic mixture;
 b) compressing and sintering the glass-ceramic mixture to form a sintered molding, which covers the noble metal element on said another side facing away from the glass melt; and
 c) heating the sintered molding to a temperature that is sufficiently high to melt said crushed glass or said glass powder in the sintered molding so as to wet said noble metal element and form a protective layer on said another side of the noble metal element facing away from the glass melt during said glass processing or production;
wherein said protective layer is an $H_2$-impervious layer or an $H_2$-impervious and $O_2$-impervious layer with a thickness greater than or equal to 1 mm.

* * * * *